United States Patent
Zhao et al.

(10) Patent No.: US 9,319,952 B2
(45) Date of Patent: Apr. 19, 2016

(54) APPARATUS AND METHODS FOR SYNCHRONIZATION RECOVERY IN A HYBRID NETWORK

(71) Applicant: Apple Inc., Cupertino, CA (US)

(72) Inventors: Wen Zhao, San Jose, CA (US); Xiaowen Wang, Cupertino, CA (US); Vinay Majjigi, Sunnyvale, CA (US); Paul Flynn, Menlo Park, CA (US); Kee-Bong Song, San Diego, CA (US); Tarik Tabet, Los Gatos, CA (US); Youngjae Kim, San Jose, CA (US); Syed Aon Mujtaba, Santa Clara, CA (US); Christian Mucke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 13/631,640

(22) Filed: Sep. 28, 2012

(65) Prior Publication Data

US 2013/0260758 A1   Oct. 3, 2013

Related U.S. Application Data (60) Provisional application No. 61/618,608, filed on Mar. 30, 2012.

(51) Int. Cl.
*H04W 36/14* (2009.01)
*H04W 76/04* (2009.01)
(Continued)

(52) U.S. Cl.
CPC .......... *H04W 36/14* (2013.01); *H04W 56/0045* (2013.01); *H04W 76/045* (2013.01); *H04W 76/026* (2013.01); *H04W 76/046* (2013.01)

(58) Field of Classification Search
CPC ............ H04W 36/14; H04W 56/0045; H04W 76/045; H04W 76/046; H04W 76/026
USPC ........ 455/436–444, 432.2; 370/328–333, 350
See application file for complete search history.

(56) References Cited

U.S. PATENT DOCUMENTS 8,238,321 B2    8/2012  Joshi et al.
2008/0310357 A1 * 12/2008 Ulupinar et al. ............. 370/329
(Continued)

FOREIGN PATENT DOCUMENTS

JP    2008538663 A    10/2008
JP    2011259073 A    12/2011
(Continued)

OTHER PUBLICATIONS

PCT Application No. PCT/US2013/034497—International Search Report and Written Opinion dated Feb. 12, 2014.
(Continued)

*Primary Examiner* — Marcos Torres
(74) *Attorney, Agent, or Firm* — Downey Brand LLP (57) ABSTRACT

Methods and apparatus for synchronizing operational state during hybrid network operation. In one embodiment, the various access technologies that makeup the hybrid network not fully synchronized. Thus, a wireless device operating in a mixed mode must be capable of managing synchronization across multiple access technologies. The wireless device is configured to estimate an expected "tune-away" period when disengaging with a one access technology to address events (for example, link maintenance, calls, data, and the like) or perform monitoring on a second access technology. The estimate is then used by the device to adjust its operational parameters on the technology from which it is tuning away. This ensures smooth switching away from and back to the various network technologies.

20 Claims, 6 Drawing Sheets

(51) Int. Cl.
*H04W 56/00* (2009.01)
*H04W 76/02* (2009.01)

(56) References Cited

U.S. PATENT DOCUMENTS

| | | |
|---|---|---|
| 2009/0175163 A1 | 7/2009 | Sammour et al. |
| 2009/0239533 A1* | 9/2009 | Somasundaram et al. .... 455/434 |
| 2009/0239554 A1 | 9/2009 | Sammour et al. |
| 2009/0287976 A1 | 11/2009 | Wang et al. |
| 2010/0003982 A1 | 1/2010 | Somasundaram et al. |
| 2010/0260147 A1* | 10/2010 | Xing et al. .................... 370/332 |
| 2011/0300859 A1 | 12/2011 | Takeda |
| 2012/0294173 A1 | 11/2012 | Su et al. |
| 2012/0294287 A1 | 11/2012 | Jeong et al. |
| 2012/0294291 A1 | 11/2012 | Su et al. |
| 2012/0297070 A1 | 11/2012 | Shi et al. |
| 2013/0315119 A1 | 11/2013 | Tabet et al. |
| 2015/0289286 A1 | 10/2015 | Su et al. |

FOREIGN PATENT DOCUMENTS

| | | |
|---|---|---|
| TW | M359160 | 6/2009 |
| TW | M363741 | 8/2009 |
| TW | M366248 | 10/2009 |
| TW | M367532 | 10/2009 |
| WO | 2013066060 | 5/2013 |

OTHER PUBLICATIONS

Taiwanese Patent Application No. 102111581—Office Action dated Oct. 23, 2014.

Japanese Patent Application No. 2015-503620—Office Action dated Oct. 19, 2015.

\* cited by examiner

APPARATUS AND METHODS FOR SYNCHRONIZATION RECOVERY IN A HYBRID NETWORK

PRIORITY AND RELATED APPLICATIONS

This application claims priority to U.S. Provisional Patent Application Ser. No. 61/618,608 filed Mar. 30, 2012 of the same title, which is incorporated herein by reference in its entirety.

This application is related to co-owned, U.S. Provisional Patent Application Ser. No. 61/599,320 filed on Feb. 15, 2012, and entitled "APPARATUS AND METHODS FOR CLIENT SERVER INTERACTION IN HYBRID NETWORK ENVIRONMENTS", U.S. Provisional Patent Application Ser. No. 61/599,325 filed on Feb. 15, 2012, and entitled "APPARATUS AND METHODS FOR OPTIMIZING SCHEDULED OPERATIONS IN HYBRID NETWORK ENVIRONMENTS", U.S. Provisional Patent Application Ser. No. 61/598,815 filed Feb. 14, 2012, and entitled "APPARATUS AND METHODS FOR NETWORK ASSISTED HYBRID NETWORK OPERATION", U.S. Provisional Patent Application Ser. No. 61/598,818 filed Feb. 14, 2012, and entitled "APPARATUS AND METHODS FOR CLIENT SERVER INTERACTION IN HYBRID NETWORK ENVIRONMENTS", U.S. Provisional Patent Application Ser. No. 61/598,824 filed Feb. 14, 2012, and entitled "APPARATUS AND METHODS FOR OPTIMIZING SCHEDULED OPERATIONS IN HYBRID NETWORK ENVIRONMENTS", U.S. Provisional Patent Application Ser. No. 61/488,620 filed May 20, 2011, and entitled "APPARATUS AND METHODS FOR NETWORK ASSISTED HYBRID NETWORK OPERATION" now U.S. patent application Ser. No. 13/475,802, filed May 18, 2012, U.S. Provisional Patent Application Ser. No. 61/488,649 filed May 20, 2011, and entitled "APPARATUS AND METHODS FOR CLIENT SERVER INTERACTION IN HYBRID NETWORK ENVIRONMENTS" now U.S. patent application Ser. No. 13/475,482, filed May 18, 2012, U.S. Provisional Patent Application Ser. No. 61/488,663 filed May 20, 2011, and entitled "APPARATUS AND METHODS FOR OPTIMIZING SCHEDULED OPERATIONS IN HYBRID NETWORK ENVIRONMENTS" now U.S. patent application Ser. No. 13/475,655, filed May 18, 2012, U.S. Provisional Patent Application Ser. No. 61/478,922 filed Apr. 25, 2011, and entitled "DUAL NETWORK MOBILE DEVICE RADIO RESOURCE MANAGEMENT", U.S. application Ser. No. 13/099,204, filed May 2, 2011, now U.S. Pat. No. 8,688,160, issued Apr. 1, 2014 and entitled "SINGLE-RADIO DEVICE SUPPORTING COEXISTENCE BETWEEN MULTIPLE RADIO ACCESS TECHNOLOGIES", U.S. Provisional Patent Application Ser. No. 61/472,617 filed Apr. 6, 2011, and entitled "MULTIPLE NETWORK MOBILE DEVICE CONNECTION MANAGEMENT", U.S. Provisional Patent Application Ser. No. 61/433,160 filed Jan. 14, 2011, and entitled "DYNAMIC LOADING IN DEVICES WITH MULTIPLE ANTENNAS", and U.S. Provisional Patent Application Ser. No. 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to operation within heterogeneous wireless systems such as, for example, hybrid network operation in which client devices can communicate using any one of several networks. More particularly, in one exemplary embodiment, methods and apparatus for synchronizing operational state during hybrid network operation are disclosed.

2. Description of Related Technology

A wireless network operator provides mobile telecommunications services to the public via a network infrastructure. For example, in the exemplary case of cellular systems, the infrastructure includes, inter alia, cellular base stations (BS), base station controllers, infrastructure or distribution nodes, etc. There are a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary cellular-related case, a hybrid device can support both: (i) Long Term Evolution (LTE) and (ii) Code Division Multiple Access 1× (CDMA 1×) networks; i.e., the device can maintain a simultaneous connection between a first LTE network and a second CDMA 1× network. For example, a LTE/CDMA 1× hybrid device can conduct a voice call over the CDMA 1× network, while the mobile device is in LTE mode for data reception or transmission. In another exemplary case, a hybrid device can support both: (i) CDMA 1×-EVDO (Evolution Data Optimized) and (ii) CDMA 1× networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, while a mobile device is attached to a first LTE network, it must periodically "tune out" or "tune away from" the LTE network to perform CDMA 1× actions (such as decoding the Quick Paging Channel (QPCH) to determine if the device is being paged). During the tune-away, the device cannot receive or transmit on the first network (in this example, LTE). If the mobile device is receiving data from the LTE network during the tune out period, this data may be lost.

Certain types of signaling messages control device state. For example, within the context of LTE networks, the mobile device needs to maintain several Radio Resource Control (RRC) and Non-Access Stratum (NAS) timers to avoid and/or properly recover from loss of state synchronization with the network. RRC signaling controls device operation; a mobile device in RRC connected mode has significantly different behavior from a mobile device in RRC idle mode. Consequently, if a device misses an RRC message, the network and the mobile device may lose synchronization, and will have different expectations on signaling and capabilities (e.g., a mobile device may attempt a data transfer on an RRC connection which is non-existent, a mobile device may be operating on stale resource allocations, etc.).

Hence, improved apparatus and methods are needed for mobile device hybrid operation which avoid loss of active communication links (including loss of critical messages and/or synchronization of processes), and which avoids unnecessary or improper operations from occurring within the mobile device as a result of such losses.

SUMMARY

The present disclosure satisfies the aforementioned needs by providing, inter glia, improved apparatus and methods for synchronizing operational state during hybrid network operation.

A method for synchronizing operational state during hybrid network operation is disclosed. In one embodiment, the method includes: identifying one or more loss events; determining a length of the one or more loss events; determining an adjustment based on the determined length of the loss event; and adjusting operation according to the determined adjustment. In one variant, the loss events are reception loss events.

An apparatus for synchronizing operational state during hybrid network operation is disclosed. In one embodiment, the apparatus is a mobile device such as a smartphone or tablet computer that is enabled for hybrid network operation.

A computer-readable storage apparatus is disclosed. In one embodiment, the apparatus includes a storage medium having at least one computer program stored thereon, the at least one program being configured to, when executed, identify one or more loss events; determine a length of the one or more loss events; determine an adjustment based on the determined length of the loss event; and adjust operation according to the determined adjustment.

A client device capable of hybrid network operation is disclosed. In one variant, the device includes indigenous logic for avoiding loss of synchronization events and improper operational state transitions.

A wireless system is disclosed. In one embodiment, the system includes at least one mobile device and two hybrid (i.e., heterogeneous RAT) network access points (e.g., base stations).

A method of operating a wireless mobile device is disclosed. In one embodiment, the method includes speculating or predicting a duration of a loss event.

A method for synchronizing a radio resource control (RRC) state within a hybrid network operation, where hybrid network operation is characterized by intermittent switching between a first long term evolution (LTE) network and a second Code Division Multiple Access 1× (CDMA 1×) network is disclosed. In one embodiment, the method includes: identifying one or more tune away events that are likely to adversely impact operation, where during the one or more tune away events a client device tunes away from the first LTE network; estimating a duration related to the one or more tune away events; determining an adjustment to a Timing Advance (TA) timer based on the estimated duration of the loss event; and adjusting the TA timer according to the determined adjustment.

In one variant, the method further includes periodically sending maintenance messages while tuned in to the first LTE network. In one such variant, the identifying of the one or more tune away events is based at least in part on the sending of the maintenance message; and the one or more tune away events are related to the second CDMA 1× network.

In a third variant, the identifying of the one or more tune away events comprises consulting a schedule of predetermined events for the second CDMA 1× network.

In a fourth variant, the determining of the adjustment is further based on a power state of the client device.

In a fifth variant, the estimating is further based at least in part on historical data related to a type associated with the one or more tune away events.

In a sixth variant, the method further includes activating a timer to determine a measured duration of the one or more tune away events.

In a seventh variant, the estimating the duration comprises summing a set of estimated durations associated with a plurality of tune away events.

In an eighth variant, the TA timer specifies a periodicity of refreshing a link value; and the determined adjustment reduces a frequency associated with the periodicity of refreshing the link value.

A wireless device for use in a hybrid network, the hybrid network comprising at least a first and a second access technology, is disclosed. In one embodiment, the wireless device includes: a first interface configured to maintain an operative link via the first access technology; a second interface configured to maintain an operative link via the second access technology; and logic configured to: based on an event associated with the first access technology, predict an occurrence of a tune-away period associated with the second access technology; analyze the event to determine a length associated with the tune-away period; and based on the length, determine one or more alterations for at least one operational mode of the second access technology.

In one variant, the first and second interface share at least one resource. In one such variant, the tune-away period comprises a release of the shared at least one resource from the second interface and an allocation of the shared at least one resource to the first interface.

In a third variant, the wireless device further comprises a power state management processor configured to provide a power state of the wireless device to the logic; and wherein the logic is further configured to adjust the determined length based at least in part on the provided power state.

In a fourth variant, the logic is further configured to: determine a performance target for the wireless device; and based on the determined performance target, adjust the determined length.

In a fifth variant, the first interface is further configured to receive a descriptor message related to a future occurrence of the event; and the prediction is based at least in part on the descriptor message. In one such variant, the descriptor message is a message selected from the group consisting of (i) a quick message indicating the possibility of a future occurrence of the event, and (ii) a full message indicating a future occurrence and type for the event.

A computer-readable apparatus configured to store one or more computer processes thereon is disclosed. In one embodiment, the computer-readable apparatus includes one or more computer processes comprising a plurality of instructions that when executed by a processor, cause the processor to: detect an end of a loss event; compare a timer value associated with the loss event with an estimate of the loss event duration; based on the comparison, determine if the timer value exceeds the estimate of the loss event duration; and when the timer value exceeds the estimate of the loss event duration, execute one or more realignment procedures.

A base station apparatus for use in a hybrid network, the base station apparatus configured to maintain a communications link to a plurality of wireless devices over a first wireless protocol is disclosed. In one embodiment, the base station apparatus includes logic configured to: generate one or more messages for at least one individual one of the plurality of wireless devices, the message signaling a future occurrence of a loss event associated with a second protocol; cause, via the one or more messages, the at least one individual one of the plurality of wireless devices to estimate a time period associated with the loss event; cause the at least one individual one of the plurality of wireless devices to adjust one or more operational parameters associated with the second protocol; and cause the at least one individual one of the plurality of wireless devices to initiate the loss event; and a wireless transceiver configure to transmit the one or more messages to the at least one individual one of the plurality of wireless devices.

An apparatus comprising a computer-readable medium configured to store one or more computer programs is disclosed. In one embodiment, the computer program includes a plurality of instructions configured to, when executed by a processor, cause the processor to: send one or more alerts to a wireless communications device, the one or more alerts configured to identify at least one link issue related to a first access technology; cause the wireless communications device to associate the at least one link issue with a loss event related to a second access technology; cause the wireless communications device to determine a period of time related to the one link issue; and cause the wireless communications device to execute one or more adjustments related to the second access technology based on the determination of the period of time.

A method of optimizing synchronization performance in a hybrid network for use with a base station apparatus is disclosed. In one embodiment, the method includes: identifying one or more events related to a wireless device in operative communication with the base station; classifying the one or more events based on a type associated with the one or more events; based on the classification, estimating a duration associated with the one or more events; generating one or more event messages for the wireless communication device in operative communication with the base station, the event message comprising at least the estimated duration; and transmitting the event message to the wireless communication device in operative communication with the base station.

Other features and advantages disclosed herein will immediately be recognized by persons of ordinary skill in the art with reference to the attached drawings and detailed description of exemplary embodiments as given below.

All FIGS. © Copyright 2012 Apple Inc. All rights reserved.

DETAILED DESCRIPTION

Reference is now made to the drawings, wherein like numerals refer to like parts throughout.

Overview

A wireless device configured for optimized synchronization in a hybrid technology network is disclosed. In various implementations, the various access technologies that makeup the hybrid network may not be aware of each other, or otherwise unable to coordinate directly. In other embodiments, the access technologies may be able to obtain periodic activity updates amongst each other, but are not integrated at a decision making level. Thus, a wireless device operating in a mixed mode must be capable of managing synchronization across multiple access technologies.

In some variants, the wireless device is configured to estimate an expected "tune-away" period when disengaging with a one access technology to address events (e.g. link maintenance, calls, data, etc.) or perform monitoring on a second access technology. The estimate is then used by the device to adjust its operational parameters on the technology from which it is tuning away. This ensures smooth switching away from and back to the various network technologies. Further, it facilitates smooth usage and reallocation of resources as wireless devices on the various technologies of the hybrid network engage and disengage during both routine and unexpected operation.

In alternate variants, when no estimate or no precise estimate of the tune-away duration is known (or available), the wireless device activates a timer (or counter). The timer remains active at least until the tune-away period ends. The value obtained from this timer allows the device to preemptively adjust its operation upon returning to a network after tuning-away. For example, if the timer exceeds a certain threshold the wireless device may initiate connection recovery procedures even in cases where other timeouts may not indicate such procedures.

It will also be appreciated by those of skill in the art, that the process of estimation and adjustment may be aided by the network. In various implementations, the network may supply timing estimates for various activities (e.g. those likely to cause loss events on other access technologies) requiring attention from a connected wireless device. Thus, the requirement that the device provide these estimates is alleviated.

Detailed Description of Exemplary Embodiments

Exemplary embodiments are now described in detail. While these embodiments are primarily discussed in the context of Long Term Evolution (LTE), Code Division Multiple Access 1× (CDMA 1×) cellular networks, and CDMA 1×EVDO (Evolution Data Optimized), it will be recognized by those of ordinary skill that the various principles described herein are not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various disclosed features are useful in combination with any network (cellular, wireless, wireline, or otherwise) that can benefit from network-based detection and mitigation of hybrid client device reception outage events.

LTE/CDMA 1× Hybrid Network Operation

Figure 1:
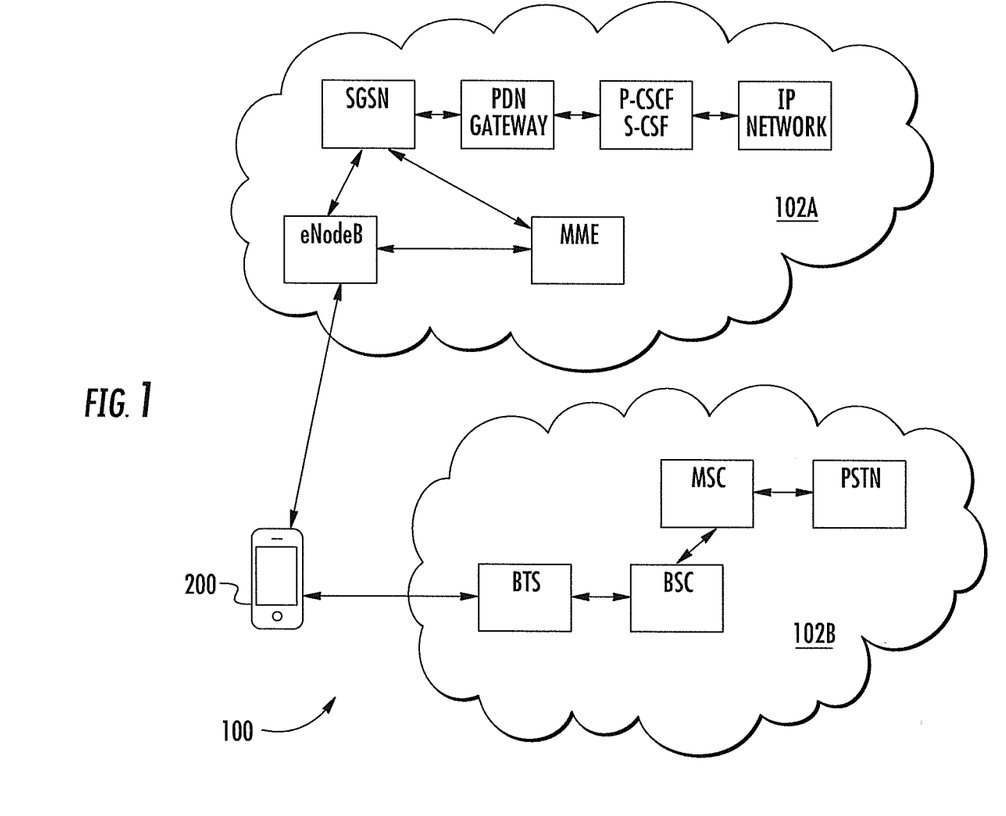
FIG. 1 is a functional block diagram illustrating one exemplary hybrid network system.

FIG. 1 illustrates an exemplary hybrid network system 100. The exemplary hybrid network includes a first LTE RAN (radio access network) 102A and a second CDMA 1×RAN 102B in communication with a user equipment (UE) client device 200. As shown in FIG. 1, the LTE RAN and CDMA 1×RAN are unsynchronized, and entirely unaware of the other RAN's operation. In other scenarios, the RANs may have higher levels of coordination; e.g., the RANs may be loosely synchronized, or even tightly synchronized, depending on the network implementation.

Figure 2:
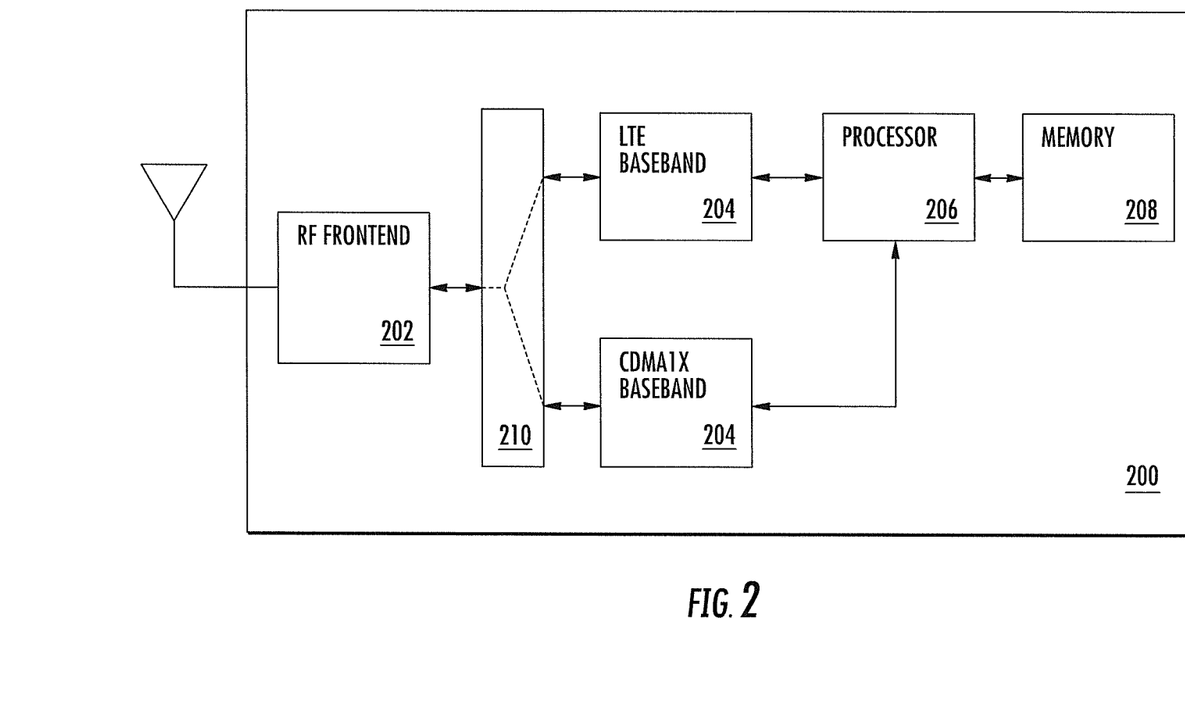
FIG. 2 is a functional block diagram of an exemplary embodiment of a user equipment (UE) apparatus.

Referring now to FIG. 2, the exemplary user equipment (UE) apparatus 200 is illustrated in greater detail. The UE of FIG. 2 is a single-radio solution to support circuit-switched calls on a CDMA 1× network and packet-switched calls on LTE; specifically, the exemplary UE has a single Radio Frequency (RF) processing "chain" which is used alternately for CDMA 1× or LTE processing. Specifically, the single RF chain periodically tunes away from LTE and monitors CDMA 1× activity, and vice versa. The UE includes: (i) one or more Radio Frequency (RF) front-ends 202, (ii) one or more baseband processors 204, and (iii) at least one application processor 206 and associated memor(ies) 208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1× network, respectively. It is further appreciated that the foregoing configuration is purely illustrative, and various implementations may include other cellular technologies such as GSM, GPRS, EDGE, WCDMA, CDMA2000, CDMA 1×EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, various embodiments may incorporate well known MIMO (Multiple In Multiple Out), SISO (Single In Single Out), MISO (Multiple In Single Out), and SIMO (Single In Multiple Out) antenna configurations that are widely used within the related arts.

Additionally, in one exemplary embodiment, the UE 200 further includes a switching fabric 210 that can connect any one (or more) of the baseband processors 204 to various one (or more) of the antennas 202. The illustrated switching fabric is adapted to connect either the LTE baseband or CDMA 1× baseband to the RF front-end. However, common embodiments may connect one baseband processor to one antenna ("one-to-one"), one-to-many, many-to-one, etc. This "switching" capability is desirable for a number of reasons, including for example: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.). Further, various embodiments may include context memory and logic to support transitioning between multiple networks such as those described in U.S. Provisional Patent Applications Ser. No. 61/599,320 filed on Feb. 15, 2012, and entitled "APPARATUS AND METHODS FOR CLIENT SERVER INTERACTION IN HYBRID NETWORK ENVIRONMENTS", 61/598,818 filed Feb. 14, 2012, and entitled "APPARATUS AND METHODS FOR CLIENT SERVER INTERACTION IN HYBRID NETWORK ENVIRONMENTS", and 61/488,649 filed May 20, 2011, and entitled "APPARATUS AND METHODS FOR CLIENT SERVER INTERACTION IN HYBRID NETWORK ENVIRONMENTS" now U.S. patent application Ser. No. 13/475,482, filed May 18, 2012 each of which being previously incorporated by reference herein. As discussed therein, the mobile device accounts for the time switched away from the LTE network in subsequent reports thereto. Moreover, the mobile device further stores to memory existing context information prior to transitioning away from a first network, to a second network. When the device returns to the first network, the device can resume operation. The device is enabled to maintain multiple active device accounts by selectively ignoring network commands.

Moreover, it will be appreciated that other components are commonly incorporated within UE 200, but are not discussed further herein. For example, the UE may include user interface components (display screens, buttons, touch screens, dials, etc.), memory components (e.g., RAM (Random Access Memory), Flash, hard disk drives (HDD), etc.), power management components (e.g., batteries, charger components, etc.), and external interfaces (e.g., FireWire™, Universal Serial Bus™ (USB), Thunderbolt, etc.).

Furthermore, it should be recognized that the UE depicted in FIG. 2 is merely illustrative of one exemplary embodiment. Still other variants are described with greater detail in co-owned U.S. Provisional Patent Application Ser. No. 61/478,922 filed Apr. 25, 2011, and entitled "DUAL NETWORK MOBILE DEVICE RADIO RESOURCE MANAGEMENT", U.S. application Ser. No. 13/099,204, filed May 2, 2011, now U.S. Pat. No. 8,688,160, issued on Apr. 1, 2014, and entitled "SINGLE-RADIO DEVICE SUPPORTING COEXISTENCE BETWEEN MULTIPLE RADIO ACCESS TECHNOLOGIES", U.S. Provisional Patent Application Ser. No. 61/472,617 filed Apr. 6, 2011, and entitled "MULTIPLE NETWORK MOBILE DEVICE CONNECTION MANAGEMENT", U.S. Provisional Patent Application Ser. No. 61/433,160 filed Jan. 14, 2011, and entitled "DYNAMIC LOADING IN DEVICES WITH MULTIPLE ANTENNAS", and U.S. Provisional Patent Application Ser. No. 61/433,162 filed Jan. 14, 2011, and entitled "MULTIMODE USER EQUIPMENT WITH DUAL CIRCUIT ARCHITECTURE", each of the foregoing being incorporated herein by reference in its entirety.

The exemplary UE 200 of FIG. 2 is capable of LTE/CDMA 1× hybrid mode operation within, e.g., the hybrid network system of FIG. 1. Specifically, the UE 200 can place CDMA 1× voice calls while registered with the LTE network. During hybrid operation, the UE can be registered to both a LTE network 102A and a CDMA 1× network 102B. The UE is capable of receiving and responding to data and control messaging from either the LTE network or the CDMA 1× network; however, as previously discussed, the UE cannot respond simultaneously to both networks, and always prioritizes CDMA 1× (voice call) traffic over LTE (data) traffic to ensure that user experience for voice calls is unaffected. Other implementations may have other prioritization schemes (e.g., where voice calls are lower priority, based on the type of traffic, historic device usage, etc.).

The prioritization discussed above can be achieved with a variety of methods. For example, in some embodiments, prioritization can be handled with the logic and processes described in U.S. Provisional Patent Applications Ser. No. 61/599,325 filed on Feb. 15, 2012, and entitled "APPARATUS AND METHODS FOR OPTIMIZING SCHEDULED OPERATIONS IN HYBRID NETWORK ENVIRONMENTS", 61/598,824 filed Feb. 14, 2012, and entitled "APPARATUS AND METHODS FOR OPTIMIZING SCHEDULED OPERATIONS IN HYBRID NETWORK ENVIRONMENTS", and 61/488,663 filed May 20, 2011, and entitled "APPARATUS AND METHODS FOR OPTIMIZING SCHEDULED OPERATIONS IN HYBRID NETWORK ENVIRONMENTS" now U.S. patent application Ser. No. 13/475,655, filed May 18, 2012 each of which being previously incorporated by reference herein. As discussed therein, a UE operating in CDMA 1× and LTE networks schedules various time-sensitive and non-time sensitive tasks of the CDMA 1× network so as to minimally affect LTE network operation. For example, a hybrid mode UE prioritizes CDMA 1× maintenance tasks as P1 (time sensitive), P2 (time insensitive), P3 (time insensitive, uninterruptible). The exemplary UE schedules LTE tasks around P1 CDMA 1× tasks, but P2 and P3 CDMA 1× tasks are flexibly advanced or delayed so as to minimally affect LTE operation.

Further, in various implementations, this prioritization may be used to avoid scheduling collisions using the processes and architectures described in U.S. Provisional Patent Applications Ser. No. 61/598,815 filed Feb. 14, 2012, and entitled "APPARATUS AND METHODS FOR NETWORK ASSISTED HYBRID NETWORK OPERATION" and 61/488,620 filed May 20, 2011, and entitled "APPARATUS AND METHODS FOR NETWORK ASSISTED HYBRID NETWORK OPERATION" now U.S. patent application Ser. No. 13/475,802, filed May 18, 2012 each of which being previously incorporated by reference herein. As discussed therein, scheduling collisions between two or more unsynchronized networks are minimized. In one embodiment, a first network allocates certain time intervals for "low priority" tasks, based on the likelihood of a "high priority" task for another network occurring during these time intervals. Since only low priority tasks are scheduled for a client device during the allocated time intervals, performance is minimally affected when the client device tunes out of the first network to communicate with the other network(s). In one exemplary implementation, the first network is not notified when the client device tunes out to interact with another network. In fact, the first network may be entirely unaware of the client device's connection status to other networks, which advantageously simplifies operation, and obviates any infrastructure changes to the network(s).

Once the UE 200 has connected to the LTE network 102A, the UE will periodically "tune" its radio away from the LTE network to perform CDMA 1× maintenance actions such as acquiring a CDMA 1× cell, registering to the acquired CDMA 1× cell, and receiving CDMA 1× pages, etc. Depending on CDMA 1× network 102B radio conditions, these actions can range in one exemplary implementation from eighty milliseconds (80 ms) up to several seconds (4 s-6 s). Those of ordinary skill in the art will recognize that there are certain situations where tune away intervals may be less than 80 ms (e.g., only a few milliseconds for Quick Paging Channel (QPICH) operation), or longer than 6 s, the foregoing range being merely illustrative. Moreover, when the UE receives or places a voice call on the CDMA 1× network, the LTE connection may be dropped. As used hereinafter, the terms "tune-away", "tune-out", etc. are interchangeably used, and similarly the reciprocal terms "tune-in", "tune-back", etc. are interchangeably used. More generally, "tune-away" operation is subsumed in a larger group of client device reception outage events. Specifically, these client device reception outage events are initiated by the client device (with or without network coordination) to intentionally or indirectly disable reception of the client device to achieve some other purpose or goal. Common examples of reasons for instigating such events include e.g., to perform measurements on other networks, to reduce power consumption, to reduce interference on other nearby devices, to preserve processing resources for other applications, etc.

Referring back to the exemplary UE 200 of FIG. 2, there are several events that can trigger a tune-away event. Common examples include (without limitation): (i) registration, (ii) location updates, (iii) paging, (iv) search operations, (v) cell measurements, (vi) voice call events (both mobile originated (MO) (i.e., placed by the mobile device), and mobile terminated (MT) (i.e., received by the mobile device)), and (vii) out of service (OOS) procedures. Tune-away events may be periodic in nature (or otherwise predictably scheduled), or may be entirely unpredictable, interrupting events, or variants or combinations thereof. The duration of tune-away events widely varies from a few milliseconds to several seconds.

For example, within this context, the UE may periodically tune-away from a LTE network to tune-in to the CDMA 1× network to detect a paging channel, and perform serving cell and neighbor cell measurements of the CDMA 1× network. More rarely, the tune-away event may require a substantially longer time interval to perform lengthy maintenance tasks. Over the course of normal operation, the mobile device periodically tunes to the CDMA 1× network for brief time intervals. Occasionally, the device must perform much lengthier tasks. Common examples of lengthier tasks include, without limitation, Location Area Updates (LAU) where the mobile device must actively exchange information with the CDMA 1× network, periods of poor reception (e.g., the mobile device may need additional time to decode messaging (e.g., paging channels, etc.)), etc.

While the foregoing scenario is discussed in relation to LTE/CDMA 1× capable client devices, it is further appreciated that similar (if not identical) complications arise in other hybrid client devices. For example, other mobile devices may be capable of Time-Division Long-Term Evolution (TD-LTE) and Time Division Synchronous Code Division Multiple Access (TD-SCDMA) technologies. In LTE (also referred to as Frequency Division Duplex LTE (FD-LTE)), the downlink and uplink are transmitted using different frequencies. In Time Division Duplex LTE (TD-LTE), the downlink and the uplink are on the same frequency and the separation occurs in the time domain, so that each direction in a call is assigned to specific timeslots.

Similarly, Time Division Synchronous Code Division Multiple Access (TD-SCDMA) allows traffic to be uplinked (from the mobile terminal to the base station) and downlinked (from the base station to the mobile terminal) using different time slots in the same frame.

Figure 3:
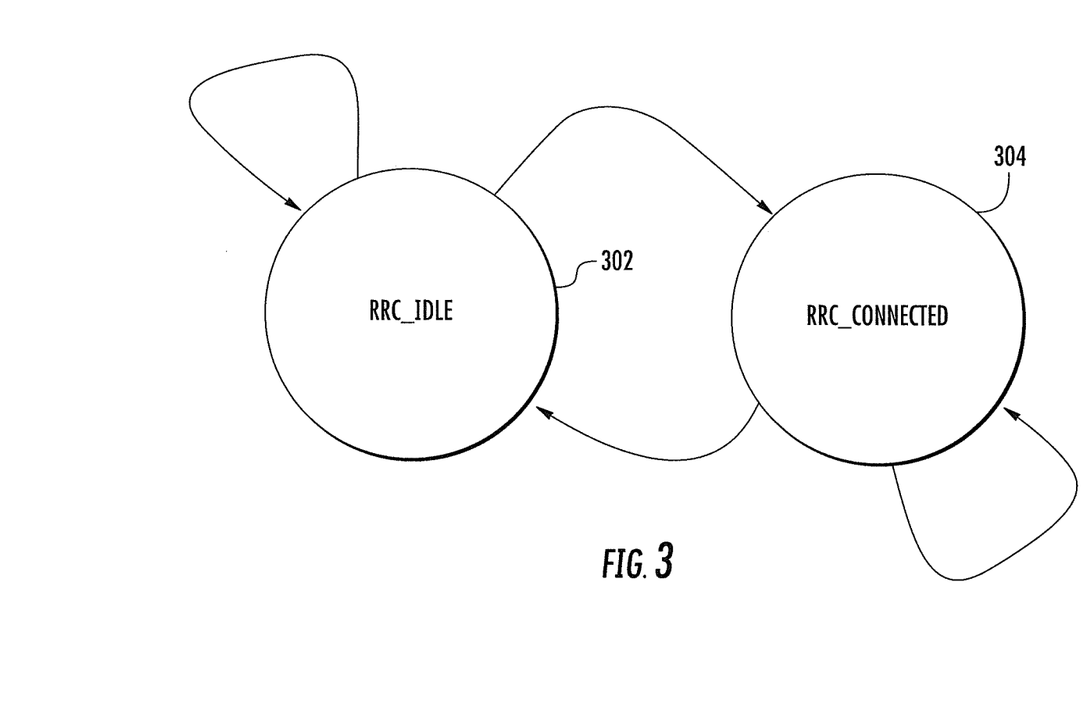
FIG. 3 is a graphical representation of one exemplary Long Term Evolution (LTE) Radio Resource Connection (RRC) state machine.

Various embodiments may further combine these technologies together and/or separately (in combination with other technologies) in a hybrid network such as by implementing the methodology described herein with respect to FIG. 3 (except using one or more different combinations of radio access technologies set forth herein). For example, in an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

Moreover, Global System for Mobile Communications (GSM) is a cellular technology standard that has evolved a number of advancements including General Packet Radio Service (GPRS), Enhanced Data rates for GSM Evolution (EDGE), and Universal Mobile Telecommunications System (UMTS) also known as 3G (Third Generation) UMTS. Various other common embodiments may further combine either LTE, or TD-LTE with any of GSM, GPRS, EDGE, UMTS, etc.

Unfortunately, during tune-away operation, the network (e.g., the evolved NodeB (eNB)) may not be aware that the UE is tuned out. This can have significant undesirable effects. For example, consider the Radio Resource Control (RRC) state machine illustrated in FIG. 3. The RRC state machine consists of two states: RRC_IDLE 302, and RRC_CONNECTED 304. Both the Core Network and the UE maintain distinct but synchronized RRC state machines (i.e., changes in the network RRC state machine are signaled to the UE RRC state machine).

As a brief aside, within RRC_IDLE 302, the UE is registered to the Core Network and will be assigned an Internet Protocol (IP) address (the IP address persists between RRC_IDLE 302, and RRC_CONNECTED 304 operations); however, the UE can only be reached by paging access and is unavailable for data transfer. In the exemplary embodiment, the UE monitors and manages its own mobility. Specifically, the UE does not have an active connection with any eNB; the UE monitors a set of eNB (according to an active set) for paging messages. If the UE receives a page (e.g., the Core Network pushing data to the UE), the UE will attempt to contact a eNB to initiate a connection. Similarly, the UE can initiate a connection to the eNB (e.g., where the user requests data). In either scenario, once the UE attempts to contact the eNB, the UE and eNB proceed through a Random Access Channel procedure (RACH attempt), and establish a connection.

Once the connection has been successfully established, the UE and the Core Network are in RRC_CONNECTED 304 mode. Within RRC_CONNECTED mode, the UE has an IP address assigned, and an active context with one eNB. The UE can freely receive and transmit data. In some cases, the UE mobility is under direct control of the network.

Figure 3A:
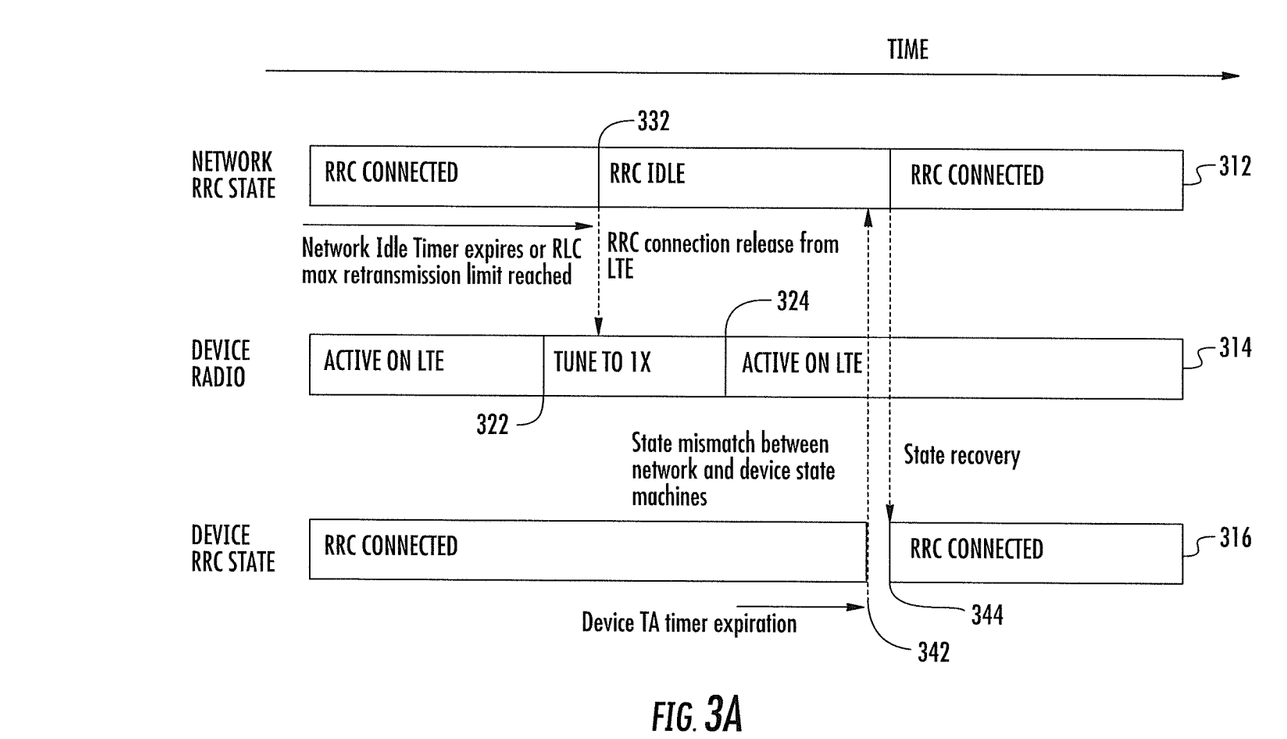
FIG. 3A is a graphical representation of tune away effects on both client device RRC state machines and network RRC state machines.

Referring now to FIG. 3A, one RRC state machine synchronization loss scenario as a function of time is illustrated. FIG. 3A illustrates the network RRC state (corresponding to a client device) 312, the client device hybrid operation technology 314, and the client device RRC state 316.

As shown, the client device is initially tuned to the LTE network, but transitions to CDMA 1x at time 322, and transitions back to LTE at time 324.

Unfortunately, at time 332, the network instructs the UE to transition from RRC_CONNECTED to RRC_IDLE while the UE is tuned away from the LTE network. Consequently, the network RRC state machine transitions to the RRC_IDLE state, whereas the device RRC state machine remains in RRC_CONNECTED state.

When the device returns from the tuned away state at time 324, the device remains in the RRC_CONNECTED state until its Timing Advance (TA) timer expires 342. The TA timer expiration triggers a lost synchronization condition, thus the device attempts to reconnect to the network to correct for synchronization loss (time 344).

As illustrated in the sequence of FIG. 3A, the mobile device loses synchronization at time 332, and remains out of synchronization until time 344. This time interval is not shown to scale herein for purposes of clarity, and accordingly can be quite long. During this synchronization loss period, the mobile device may also be wasting appreciable battery power while operating in an incorrect state (e.g., continued improper attempts to decode a control channel).

Moreover, since both the mobile device and the network have a state mismatch, both parties may transact control or data signaling which is incorrectly interpreted and/or lost, or which may conflict with other signaling or operations.

It is further appreciated that while the foregoing example is illustrative, it is by no means comprehensive. Within the context of an LTE/CDMA 1x hybrid device, many events can create a state mismatch. For example, the network has multiple conditions which can trigger an RRC state change (e.g., network timer expirations, a maximum number of Radio Link Control (RLC) retransmissions, etc.).

In various embodiments, reference estimates of tune-away times may be provided by the network (e.g. via the eNB RLC layer). For example, upon transmitting a paging message to a UE, the eNB may also provide a tune-away estimate of the period that the UE has dedicated to addressing the paging message. In some variants this estimate may include a time value. In other variants, the reference estimate may be a coarse qualitative estimate (e.g. "short," "moderate," "long," or "indefinite"). In yet other variants, this estimate may be provided in reference to a threshold (e.g. 100 ms or 200 ms). This threshold may be based on a time constant used by various networks (e.g. an in-sync or out-of-sync timeout). In some embodiments, the reference estimate may be provided such that it can be decoded independently of the accompanying event or transmission. Thus, the UE may obtain the estimate without need to first address or determine the nature of the event. In some cases, this may facilitate the UE's adjustment of its operation on the network when tuning away.

More generally, those of ordinary skill in the related arts will readily recognize given the present disclosure that state synchronization (mismatch) scenarios will occur in, inter glia, any scenario where a hybrid device and network operate according to a synchronized state, and where the hybrid device can miss state updates from the network, and that the various embodiments may be readily applied thereto. For example, while the foregoing scenario was illustrated in regards to a LTE state machine (RRC_CONNECTED, RRC_IDLE), it is further appreciated that state machines are widely used throughout the related arts. For instance, within UMTS, the UE and Core Network maintain a similar but more complex state machine (e.g., RRC_IDLE, URA_PCH, CELL_PCH, CELL_DCH, CELL_FACH, etc.). In another such example, within GPRS and GSM systems, the UE and the Core Network have an analogous state machines (GPRS uses GPRS Packet Transfer Mode, GPRS Packet Idle Mode; GSM utilizes a GSM Connected Mode, GSM Idle Mode).

Methods

Figure 4:
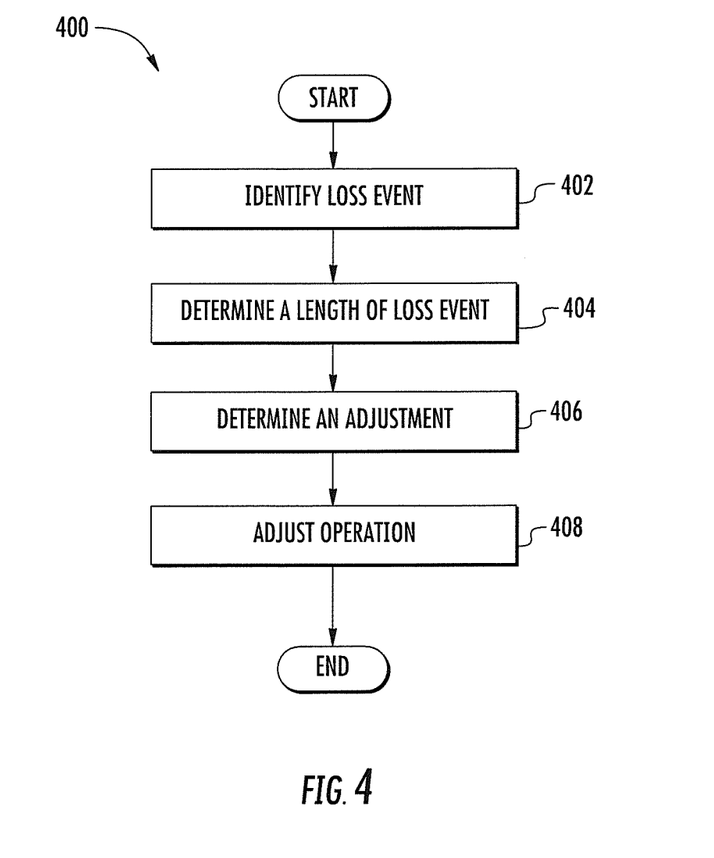
FIG. 4 is a logical flow diagram detailing one embodiment of a generalized method for synchronizing operational state during hybrid network operation.

Referring now to FIG. 4, one embodiment of a generalized method 400 for synchronizing operational state during hybrid network operation is illustrated. In one scenario, a client device is connected to a first network, where the first network is entirely unaware of the client device's connections to other networks. Alternatively, the first network may have limited information on nearby networks (e.g., timing information, registered devices, etc.) which may be periodically refreshed, but is not integrated within the operational decisions for the first network. For example, in one exemplary embodiment, a mobile device configured for single-radio operation on a Long Term Evolution (LTE) network and a CDMA 1× network, camps on a LTE network, and periodically tunes to the CDMA 1× network to receive voice calls.

At step 402 of the method 400, the client device identifies one or more loss events. In one variant, the loss events are reception loss events, and are one or more scheduled "tune away" events. In other variants, the loss events are initiated by a user device (e.g., where a device initiates a voice call, or conversely where a device initiates a data transaction). Other examples of loss events include, for example: power saving modes, reception outages, excessive interference, etc.

In one exemplary embodiment, a mobile device which is operating on a LTE network is scheduled to tune away from the LTE network according to a schedule, so as to tune into a CDMA 1× network to perform certain functions such as: paging channel reception, serving cell measurements, neighbor cell measurements, updates (e.g., location updates, device state updates, etc.).

At step 404 of the method 400, the client device determines the length of the one or more loss events. In one implementation, the client device starts a timer at the start of a loss event, and stops the timer at the end of the loss event; the elapsed time is the length of the loss event. For example, as a mobile device tunes away from the LTE network it starts a timer; once the mobile device returns to the LTE network, the device stops the timer and measures the elapsed time. Such implementations measure the time spent tuned away from the LTE network. In an alternate approach, the mobile device may measure the amount of time spent in another network (e.g., the timer measures the elapsed time tuned into the CDMA 1× network). The "measurements" may also not be explicitly temporally driven, but rather may also be event- or operation-related (e.g., a prescribed number of cycles, counter increments, operations, etc.).

Timer (or counter/event-driven) embodiments can be of particular use where reception loss events are of an indeterminate or unpredictable length. For example, during paging reception events, a mobile device may tune away for a relatively short instance (e.g., no page message), or more significant durations (e.g., where the mobile device checks a paging message, etc.). Certain technologies may utilize a tiered paging message scheme (e.g., the device may check a quick paging channel to determine if it should check the paging channel; if the quick paging channel indicates a possible page, the mobile device must fully decode the paging channel). Such tiered schemes are typically characterized by short tune away durations (e.g., no page), moderate tune away durations (e.g., quick paging channel decode and no page), and long (possibly unpredictable) tune away durations (e.g., full paging message decode sequence), or combinations of the foregoing.

For example, LTE short tune away durations occur when the Quick Paging Channel (QPCH) decode concludes that a Paging Channel (PCH) decode is unnecessary. Moderate tune away durations occur when the QPCH decode is inconclusive and the PCH decode ends quickly. Long (and/or unpredictable) tune away durations occur when the QPCH decode is inconclusive or concludes that the PCH decode is necessary, and where the PCH decode does not end quickly (e.g., where the device is being paged).

In some embodiments, the client device can predict or speculate on the length of the reception loss event. For example, certain tune away events have fixed (or substantially predictable) times or event counts. Common examples of fixed loss events include e.g., cell measurements, registration messaging, state updates, etc. For example, a mobile device may need to periodically tune into the CDMA 1× network to perform serving cell measurements, and/or neighbor cell measurements. These measurements entail "fixed" length calculations e.g., calculating a Received Signal Strength Index (RSSI) over a set time interval, calculating a Bit Error Rate (BER) of a known signal, etc. Predictable lengths may be determined based on calculation (e.g., tabulating the time necessary to perform a set of tasks), approximation (e.g., average time to perform a number of measurements), predetermined or preset values, etc.

In other alternative embodiments, the client device can determine the time elapsed by e.g., counting a number of missed signals to determine the length of the reception loss event. For example, in networks that have a repeating count (e.g., frames numbered 0 through 19) the mobile device can determine the number of frames missed while tuned away.

In still other embodiments, the network may broadcast a running network time which the mobile device can use to determine total elapsed time. In some such variants, the mobile device may be able to determine the difference in time based on e.g., the change in a running sequence (e.g., a running pseudorandom noise (PN) sequence, etc.).

Returning again to FIG. 4, at step 406 of the method 400, the client device determines an appropriate adjustment, based on the length of the (reception) loss event. In one exemplary embodiment, the mobile device adjusts one or more timer values based on the length of the reception loss event. Common examples of timers include e.g., Timing Advance (TA) timers, radio link failure timers (e.g., T310/T311 in LTE), etc. For example, within LTE networks, the client device maintains a TA timer which measures the time elapsed since the previous TA command. If the mobile device receives a TA command, the timer is reset. If the TA timer expires, then the UE will responsively initiate a resynchronization sequence, which entails initiating connection establishment.

As a brief aside, within the context of LTE networks, the TA timer ensures that the mobile device does not have a significant deviation in timing from the network. From time to time, the network transmits a TA command which allows the mobile device to adjust its timing consistent with the network. When the mobile device receives the TA command, it resets its TA timer. If the TA timer expires, then the mobile device will initiate a Random Access Channel (RACH) access to explicitly re-align its time base.

As a brief aside, consider a mobile device that adjusts a Timing Advance (TA) timer based on the length of time exceeding one or more thresholds. In one scheme, the mobile device implements a multi-tiered approach. Below a first threshold, the mobile device may simply reinstate the TA timer without adjustment; very short tune away intervals do not substantially affect the device time. Above the first threshold and below a second threshold, the mobile device may adjust the TA timer according to the length of time (or some proportion thereof). In some variants, the mobile device may have multiple thresholds (above a first threshold the adjustment is a first proportion of the length of time, above a second threshold the adjustment is a second proportion of the length of time, etc.). In still other implementations, the device may have a maximal threshold above which the mobile device automatically forces a re-alignment procedure.

Different variations may determine thresholds according to different schemes. For example, in one scheme the thresholds may be fixed, or otherwise preset according to the mobile device. In still other approaches, the thresholds may be determined by the network (e.g., the network may directly control the thresholds to maximize certain network behaviors). In still other embodiments, the thresholds may be determined based on network criteria, but not directly by the network itself. For example, the network may broadcast certain timing configurations, which the mobile device can use to adjust its behavior. In one exemplary embodiment, the mobile device can configure its thresholds as a function of a network parameter for e.g., LTE networks specify TA timer expiration lengths from hundreds of milliseconds (ms) to several seconds. For example, the network may set the TA timer for all mobile devices to be two (2) seconds, thus the client device may adjust its behavior such that the thresholds occur at various fractions thereof (e.g., 500 ms, and 1 s). Consequently, if the TA timer parameter is modified by the network, the client device's thresholds are dynamically modified as well.

Referring back to step 406 of FIG. 4, it is further appreciated that other embodiments may make use of counters rather than timers. Common examples of counters include e.g., failure counts, etc. For example, one such counter is a Radio Link Control (RLC) maximum retransmission limit which is incremented each time the network fails to properly receive a retransmitted packet. Generally, the RLC maximum retransmission limit counter ensures that ongoing communications between the mobile device and network meet minimum connection performance. During normal operation, the mobile device (and network counterpart) may increment the counter for each RLC failure. In one exemplary embodiment, the mobile device additionally increments the RLC maximum retransmission limit based on the elapsed length of reception loss, to reflect the absence of retransmissions while the mobile device was tuned away.

The adjustment of step 406 of the method 400 may alternatively (or additionally) be dynamic in nature, such as e.g., based on historic or statistical analysis, or even on contemporaneous operational considerations. It is appreciated that overly generous thresholds which extend the amount of time before the mobile device actively re-aligns to the network will reduce the mobile device's power efficiency (i.e., because the mobile device spends more time in RRC_CONNECTED operation). Similarly, overly conservative thresholds which minimize the amount of time before the mobile device actively re-aligns to the network will adversely affect network resources (i.e., the mobile device will consume significant network resources performing excessive re-alignment procedures). Accordingly various implementations may dynamically adjust one or more threshold values. For example, over multiple iterations, the mobile device may steadily tune its thresholds to optimize mobile behavior, such as e.g., based on a rolling historical average or other statistical parameter. In still other embodiments, the mobile device may adjust its threshold values based on one or more network constraints, and/or user considerations. For example, certain users may be less concerned with power consumption, preferring instead to maximize snappy response; other users may be less interested in performance and more interested in its power consumption. Moreover, the extant state of the battery itself may be used to drive dynamic adjustment of the threshold(s), such as where the less power-friendly threshold is used when the battery is at a high state of charge, but is progressively (or step-wise) traded for more power-friendly values as the battery depletes.

At step 408 of the method, the client device adjusts operation according to the determined adjustment. In one exemplary embodiment, the client device adjusts one or more timers; for example, a mobile device that tunes back to the LTE network reduces its TA timer to compensate for its time spent tuned away. In other examples, the client device increments or decrements one or more counters in accordance with the determined adjustment.

Example Operation

Figure 5:
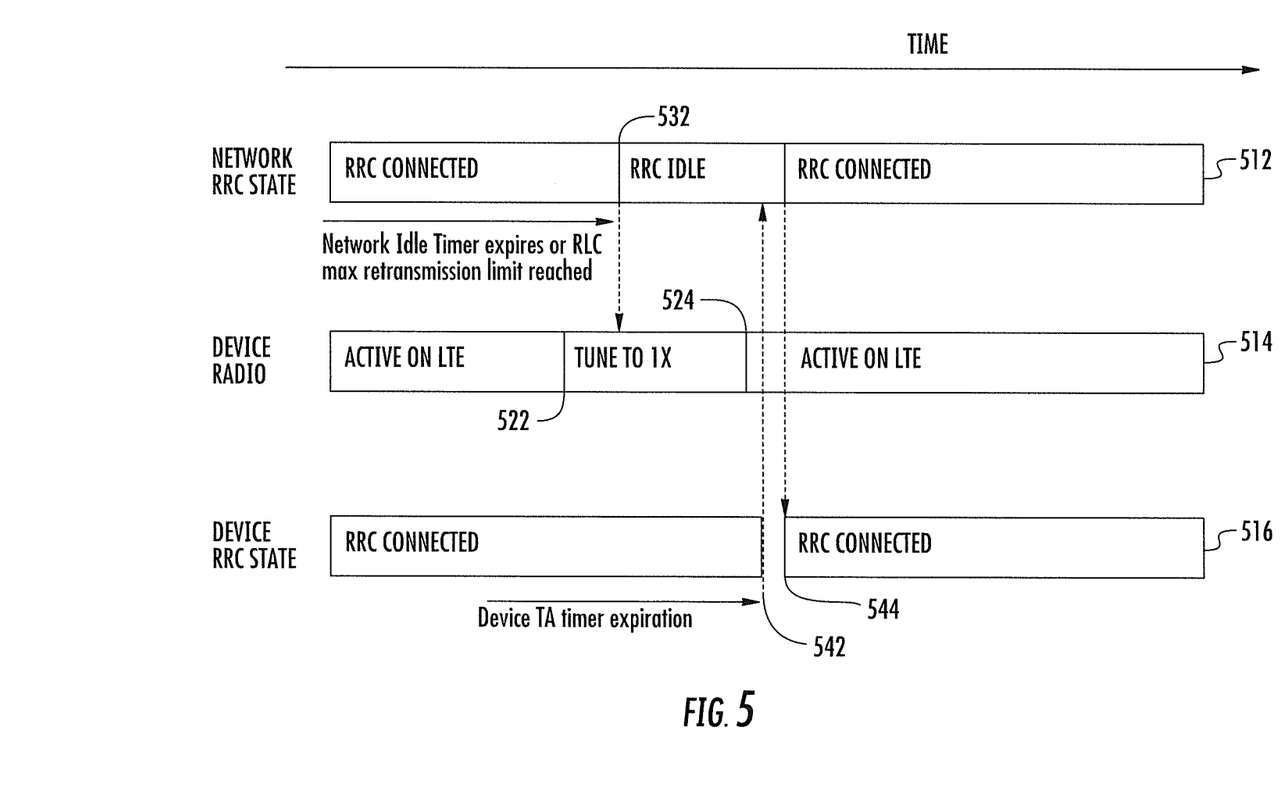
FIG. 5 is a graphical representation of client device RRC state machines and network RRC state machines, in accordance with one exemplary embodiment during tune away operation.

Referring now to FIG. 5, one exemplary implementation of the method 400 of FIG. 4 is shown and described. Specifically, the exemplary embodiment of the method 500 in FIG. 5 is described in the context of synchronizing operational state during hybrid network operation. In one scenario, the hybrid client device is a single-radio solution capable of communicating with a Long Term Evolution (LTE) network and Code Division Multiple Access 1× (CDMA 1×) network. While the following operation is described with reference to the evolved Node B (eNB) of the LTE network, it is readily appreciated that various principles disclosed herein are widely applicable to base stations (regardless of technology), and more generally wireless server devices of any type (e.g., ad hoc networks, etc.)

FIG. 5 shows one exemplary RRC state machine recovery scenario as a function of time. Specifically, the network RRC state (corresponding to a client device) 512, the client device hybrid operation technology 514, and the client device RRC state 516 are shown.

As illustrated in FIG. 5, the client device is initially tuned to the LTE network, but transitions to CDMA 1× at time 522, and transitions back to LTE at time 524. During the tune away period, no valid measurement reports (e.g., in-sync, out-of-sync, etc.) are transacted between the mobile device and the network. The upper layers of the LTE network will treat all lower layer reports as out-of-sync reports (equivalent to a radio outage) during the tune away period.

Unfortunately, at time 532, the network instructs the UE to transition from RRC_CONNECTED to RRC_IDLE while the UE is tuned away from the LTE network. Consequently, the network RRC state machine transitions to the RRC_IDLE state, whereas the device RRC state machine remains in RRC_CONNECTED state.

When the device returns from the tuned away state at time 524, the device determines the amount of time spent tuned away (the elapsed time between time 522 and time 524). The result is factored into the TA timer.

The device remains in the RRC_CONNECTED state until its Timing Advance (TA) timer expires 542. The TA timer expiration triggers a lost synchronization condition, and the device attempts to reconnect to the network to correct for synchronization loss (time 544). For longer thresholds (not shown), the device can proactively start the synchronization recovery procedure (e.g., RRC connection reestablishment) immediately upon returning to the LTE network, instead of waiting for the TA timer expiration.

A comparison between the transactions of FIG. 5 and FIG. 3A illustrates the reduction in state mismatch. As illustrated in the sequence of FIG. 5, the mobile device quickly recovers from state mismatch.

It will be appreciated that while the disclosed embodiments are described primarily with respect to client-centric hybrid operation, principles presented herein are in no way so limited. For example, the present disclosure contemplates embodiments or implementations wherein (i) the network, such as an eNB or other entity, performs at least some of the logical processing and/or directs various aspects of UE operation relating to tune-away operation, and/or (ii) the UE and network entity maintain some sort of communication regarding state synchronization.

It will be recognized that while certain features are described in terms of a specific sequence of steps of a method, these descriptions are only illustrative of the broader methods disclosed herein, and may be modified as required by the particular application. Certain steps may be rendered unnecessary or optional under certain circumstances. Additionally, certain steps or functionality may be added to the disclosed embodiments, or the order of performance of two or more steps peiinuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles described herein.

What is claimed is:

1. A method by a (UE) client device during a hybrid network operation, where hybrid network operation of the UE client device is characterized by intermittent switching between a first long term evolution (LTE) network and a second Code Division Multiple Access 1× (CDMA 1×) network, the method comprising:
   by the UE client device:
   identifying one or more tune away events that are likely to adversely impact operation of the UE client device, where during the one or more tune away events the UE client device tunes away from the first LTE network;
   estimating a duration of the one or more tune away events;
   determining an adjustment to a Timing Advance (TA) timer maintained at the UE client device based on the estimated duration of the one or more tune away events, wherein the adjustment is determined to support triggering a loss of state synchronization;
   after completion of the one or more tune away events, adjusting the TA timer according to the determined adjustment;
   identifying the loss of state synchronization subsequent to the adjusting and based on an expiration of the TA timer; and
   sending a Random Access Channel (RACH) sequence to the LTE network subsequent to identifying the loss of state synchronization.

2. The method of claim 1, further comprising periodically sending one or more maintenance messages while tuned in to the first LTE network.

3. The method of claim 2, wherein the UE client device identifies the one or more tune away events based at least in part on the sending of the one or more maintenance messages; and
   wherein during the one or more tune away events, the UE client device tunes to the second CDMA 1× network.

4. The method of claim 1, wherein the UE client device identifies the one or more tune away events by consulting a schedule of predetermined events for the second CDMA 1× network.

5. The method of claim 1, wherein the UE client device determines the adjustment of the TA timer further based on a power state of the UE client device.

6. The method of claim 1, wherein the UE client device estimates the duration of the one or more tune away events based at least in part on a set of historical data for a type of event associated with the one or more tune away events.

7. The method of claim 1, wherein the UE client device estimates the duration of the one or more tune away events by activating at least one timer to measure the duration of the one or more tune away events.

8. The method of claim 1, wherein the UE client device estimates the duration of the one or more tune away events by summing a set of estimated durations for each of a plurality of tune away events.

9. The method of claim 1, further comprising:
   exchanging information with the second CDMA 1× network to perform a location area update (LAU).

10. A wireless device configurable for hybrid network operation in a first network according to a first access technology and in a second network according to a second access technology, the wireless device comprising:
    a first interface configured to maintain an operative link via the first access technology;
    a second interface configured to maintain an operative link via the second access technology; and
    logic coupled to the first and second interfaces and configured to cause the wireless device to:
    based on an event associated with the first access technology, predict an occurrence of a tune away period associated with the second access technology;
    analyze the event to determine a length of the tune away period;
    based on the length of the tune away period, determine an adjustment to a Timing Advance (TA) timer maintained at the wireless device, wherein the adjustment is determined to support triggering a loss of state synchronization;
    adjust the TA timer according to the determined adjustment after a completion of a tune away event;
    identify the loss of state synchronization, subsequent to the adjusting and based on an expiration of the TA timer; and
    send a Random Access Channel (RACH) sequence to the second network subsequent to identifying the loss of state synchronization.

11. The wireless device of claim 10, wherein the first and second interfaces share at least one resource.

12. The wireless device of claim 11, wherein during the tune away period the wireless device releases the shared at least one resource from the second interface and allocates the shared at least one resource to the first interface.

13. The wireless device of claim 10, wherein the wireless device further comprises a power state management processor configured to provide a power state of the wireless device to the logic; and
    wherein the logic is further configured to cause the wireless device to adjust the determined length of the tune away period based at least in part on the provided power state of the wireless device to reduce power consumption.

14. The wireless device of claim 10, wherein the logic is further configured to cause the wireless device to:
    determine a performance target for the wireless device; and
    based on the determined performance target, adjust the determined length of the tune away period.

15. The wireless device of claim 10, wherein the first interface is further configured to receive a descriptor message from the first network related to a future occurrence of the event associated with the first access technology; and wherein the wireless device predicts the occurrence of the tune away period associated with the second access technology based at least in part on the descriptor message.

16. The wireless device of claim 15, wherein the descriptor message is a message selected from a group consisting of (i) a quick message indicating a possibility of a future occurrence of the event, or (ii) a full message indicating a future occurrence of the event and a type for the event.

17. A non-transitory computer-readable apparatus configured to store one or more computer processes thereon, the one or more computer processes comprising a plurality of instructions that, when executed by a processor, cause a user equipment (UE) client device to:
   identify one or more tune away events that are likely to adversely impact operation of the UE client device, wherein during the one or more tune away events the UE client device tunes away from a first network to a second network;
   estimate a duration of the one or more tune away events;
   determine an adjustment to a Timing Advance (TA) timer maintained at the UE client device based at least in part on the estimated duration of the one or more tune away events, wherein the adjustment is selected to support triggering a loss of state synchronization;
   after completion of the one or more tune away events, adjust the TA timer according to the determined adjustment;
   identify the loss of state synchronization subsequent to the adjusting and based on an expiration of the TA timer; and
   send a Random Access Channel (RACH) sequence to the LTE network subsequent to identification of the loss of state synchronization.

18. The wireless device of claim 10, wherein the logic is further configured to cause the wireless device to:
   exchange information with the second network to perform a location area update (LAU).

19. The non-transitory computer-readable apparatus of claim 17, wherein the plurality of instructions further cause the UE client device to determine the adjustment to the TA timer by comparing the estimated duration of the one or more tune away events to one or more thresholds that include at least:
   a first threshold for which, when the estimated duration of the one or more tune away events does not exceed the first threshold, the UE client device reinstates the TA timer without adjustment; and
   a second threshold for which, when the estimated duration of the one or more tune away events does not exceed the second threshold and equals or exceeds the first threshold, the UE client device determines the adjustment to the TA timer according to the estimated duration of the one or more tune away events.

20. The non-transitory computer-readable apparatus of claim 17, wherein the plurality of instructions further cause the UE client device to:
   exchange information with the second network to perform a location area update (LAU).

* * * * *